(12) United States Patent
Kim et al.

(10) Patent No.: US 11,082,612 B2
(45) Date of Patent: Aug. 3, 2021

(54) ELECTRONIC DEVICE AND IMAGE ACQUISITION METHOD THEREOF

(71) Applicant: Samsung Electronics Co., Ltd., Gyeonggi-do (KR)

(72) Inventors: Jaeho Kim, Gyeonggi-do (KR); Jinmin Bang, Gyeonggi-do (KR); Dohan Kim, Gyeonggi-do (KR); Changwoo Lee, Gyeonggi-do (KR); Kwanho Kim, Gyeonggi-do (KR); Jonghoon Won, Gyeonggi-do (KR); Kihuk Lee, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/763,261

(22) PCT Filed: Nov. 29, 2018

(86) PCT No.: PCT/KR2018/014955
§ 371 (c)(1),
(2) Date: May 12, 2020

(87) PCT Pub. No.: WO2019/107968
PCT Pub. Date: Jun. 6, 2019

(65) Prior Publication Data
US 2020/0336653 A1    Oct. 22, 2020

(30) Foreign Application Priority Data

Dec. 1, 2017    (KR) ........................ 10-2017-0164524

(51) Int. Cl.
*H04N 5/228* (2006.01)
*H04N 5/232* (2006.01)
(Continued)

(52) U.S. Cl.
CPC ......... *H04N 5/23227* (2018.08); *H04N 5/144* (2013.01); *H04N 5/2351* (2013.01);
(Continued)

(58) Field of Classification Search
CPC ........... H04N 5/23227; H04N 5/23218; H04N 5/144; H04N 5/145; H04N 5/2351;
(Continued)

(56) References Cited

U.S. PATENT DOCUMENTS

2011/0298942 A1    12/2011  Uchida et al.
2014/0313360 A1    10/2014  Lee et al.
(Continued)

FOREIGN PATENT DOCUMENTS

JP    2010-199656 A    9/2010
JP    6076205 B2    1/2017
(Continued)

*Primary Examiner* — Kelly L Jerabek
(74) *Attorney, Agent, or Firm* — Cha & Reiter, LLC

(57) ABSTRACT

An electronic device according to various embodiments of the present invention comprises a processor and an image sensor module electrically connected to the processor, wherein: the image sensor module comprises an image sensor and a control circuit, which is electrically connected to the image sensor and is connected to the processor by an interface; the control circuit is set so as not to compress at least one image acquired from the image sensor according to a first readout speed, but to transmit the same to the processor, and to compress at least one image acquired from the image sensor according to a second readout speed that is faster than the first readout speed and to transmit the same to the processor; and the processor can be set so as to acquire a first image set by using the image sensor according to a predetermined readout speed, compare at least two images included in the first image set, set, as either the first readout speed or the second readout speed, the readout speed corresponding to the image sensor on the basis of the result of
(Continued)

the comparison of the at least two images included in the first image set, and acquire a second image set according to either the set first readout speed or second readout speed, by using the image sensor. Additional various embodiments are possible.

15 Claims, 15 Drawing Sheets

(51) Int. Cl.
    *H04N 5/14*     (2006.01)
    *H04N 5/235*     (2006.01)
    *H04N 5/378*     (2011.01)

(52) U.S. Cl.
    CPC ....... *H04N 5/2353* (2013.01); *H04N 5/23218* (2018.08); *H04N 5/378* (2013.01)

(58) Field of Classification Search
    CPC ...... H04N 5/2353; H04N 5/378; H04N 5/341; H04N 5/351
    See application file for complete search history.

(56) References Cited

U.S. PATENT DOCUMENTS

| | | |
|---|---|---|
| 2015/0163434 A1 | 6/2015 | Ishibashi |
| 2015/0341531 A1 | 11/2015 | Senda |
| 2017/0006208 A1 | 1/2017 | Du et al. |

FOREIGN PATENT DOCUMENTS

| | | |
|---|---|---|
| KR | 10-2014-0125983 A | 10/2014 |
| KR | 10-2015-0067900 A | 6/2015 |
| KR | 10-2016-0090379 A | 7/2016 |
| WO | 2017/069406 A1 | 4/2017 |

ELECTRONIC DEVICE AND IMAGE ACQUISITION METHOD THEREOF

CROSS REFERENCE TO RELATED APPLICATIONS

This application is a National Phase Entry of PCT International Application No. PCT/KR2018/014955, which was filed on Nov. 29, 2018, and claims a priority to Korean Patent Application No. 10-2017-0164524, which was filed on Dec. 1, 2017, the contents of which are incorporated herein by reference.

TECHNICAL FIELD

The disclosure relates to an electronic device and an image acquisition method thereof.

BACKGROUND ART

As technologies are developed, various types of electronic devices, such as a personal digital assistant (PDA), an electronic notebook, a smart phone, a tablet personal computer (PC), and the like are being provided. Electronic devices are equipped with cameras, and may provide various functions related to a camera to users. For example, an electronic device displays a preview image acquired via a camera on a display, and may acquire the image displayed on the display when a user selects a shooting function button (e.g., a shutter).

DETAILED DESCRIPTION OF INVENTION

Technical Problem

An electronic device equipped with a camera may include an image sensor, and the image sensor may accumulate electron hole pairs (EHP) when light is detected. In this instance, the electronic device may read out EHPs accumulated in the image sensor, and may acquire an image based on the read out EHP. As the amount of time spent on completely reading out EHPs that correspond to a single image (hereinafter, "readout duration") and are accumulated in the image sensor, becomes shorter, that is, the readout speed of the electronic device becomes faster, the amount of power consumed by the electronic device becomes higher.

In the case in which a subject that moves fast is shot, or a subject is shot in an environment having a low illuminance, as the readout speed of the electronic device becomes faster, the distortion of an image (e.g., rolling shutter distortion, motion blur, and the like) may occurs less frequently. However, if the readout speed of the electronic device is fast when a subject is shot in an environment having a high illuminance, or a subject that moves slowly is shot, the power of the electronic device may be unnecessarily consumed, which is a drawback.

Solution to Problem

In accordance with an aspect of the disclosure, an electronic device may include: a processor; and an image sensor module electrically connected to the processor, wherein the image sensor module includes an image sensor and a control circuit, which is electrically connected to the image sensor and is connected with the processor via an interface, wherein the control circuit is configured to: transmit at least one image which is acquired from the image sensor according to a first readout speed, to the processor without compressing the at least one image; and compress at least one image which is acquired from the image sensor according to a second readout speed that is faster than the first readout speed, and transmit the at least one compressed image to the processor, wherein the processor is configured to: obtain a first image set according to a predetermined readout speed, using the image sensor; compare at least two images included in the first image set; set a readout speed corresponding to the image sensor to one of the first readout speed or the second readout speed, based on a result of comparison between the at least two images included in the first image set; and obtain a second image set according to the set readout speed, which corresponds to one of the first readout speed or the second readout speed, using the image sensor.

In accordance with an aspect of the disclosure, an electronic device may include: an image sensor; a compressor electrically connected to the image sensor and configured to compress an image; a multiplexer electrically connected to the image sensor and the compressor; a demultiplexer electrically connected to the multiplexer; a decompressor electrically connected to the demultiplexer, and configured to decompress a compressed image; a controller electrically connected to the image sensor and the multiplexer; and a processor electrically connected to the demultiplexer, the decompressor, and the controller, wherein the controller is configured to: control the image sensor so as to acquire at least one image according to one of a first readout speed and a second readout speed; control the image sensor so as to transmit, to the compressor, at least one image acquired according to the first readout speed; control the image sensor so as to transmit, to the compressor, at least one image acquired according to the second readout speed; and perform control so that the multiplexer transmits, to the demultiplexer, one of an image received from the compressor and an image received from the image sensor, wherein the demultiplexer is configured to transmit at least one image received from the multiplexer to one of the decompressor and the processor, and wherein the processor is configured to: obtain a first image set according to a designated readout speed using the image set; compare at least two images included in the first image; set a readout speed corresponding to the image sensor to one of the first readout speed or the second readout speed, based on a result of comparison between the two or more images included in the first image set; transmit, to the controller, a command related to setting of the readout speed corresponding to the image sensor; and obtain a second image set according to the set readout speed, which corresponds to one of the first readout speed or the second readout speed, using the image sensor.

In accordance with an aspect of the disclosure, a method of acquiring an image by an electronic device may include: obtaining a first image set according to a designated readout speed using an image sensor of the electronic device, by a processor of the electronic device; comparing, by the processor, at least two images included in the first image set; setting a readout speed corresponding to the image sensor to one of a first readout speed or a second readout speed, which is faster than the first readout speed, based on a result of comparison between the at least two images included in the first image set; and obtaining, by the processor, a second image set according to the set readout speed, which corresponds to one of the first readout speed or the second readout speed, using the image sensor; compressing at least one image acquired using the image sensor according to the first readout speed, and transmitting the compressed image to the processor; and transmitting at least one image acquired from the image sensor according to the second readout speed to the processor without compression.

Advantageous Effects of Invention

According to various embodiments, an electronic device may be prevented from unnecessarily consuming power by controlling the readout speed of the electronic device according to various situations related to photographing.

According to various embodiments, if the readout speed is fast, an image obtained from an image sensor may be compressed and may be transferred to a processor. Accordingly, the processor may obtain an image fast, irrespective of the performance of an interface related to transmission of an image.

MODE FOR THE INVENTION

Figure 1:
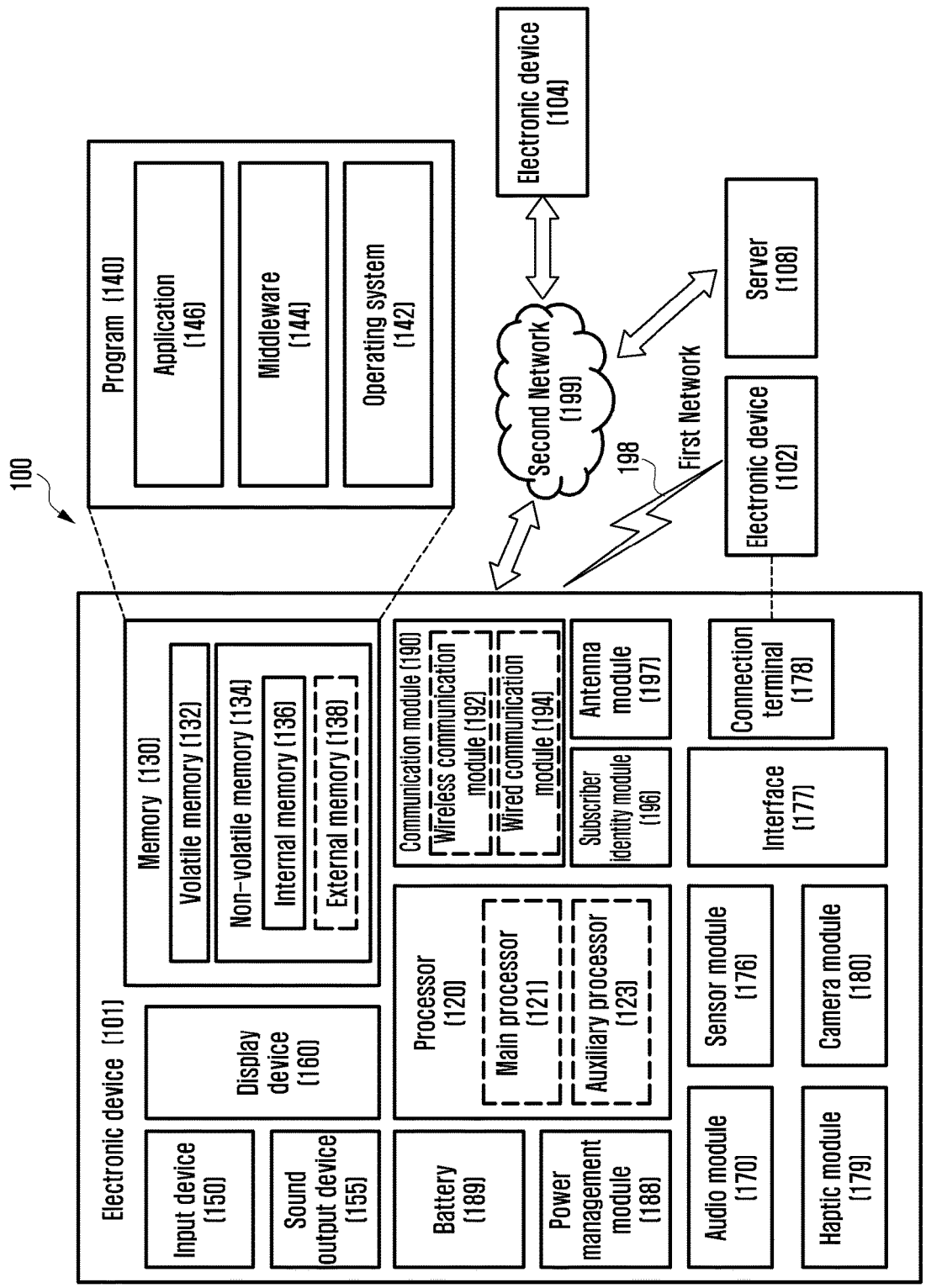
FIG. 1 is a block diagram of an electronic device in a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation.

According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
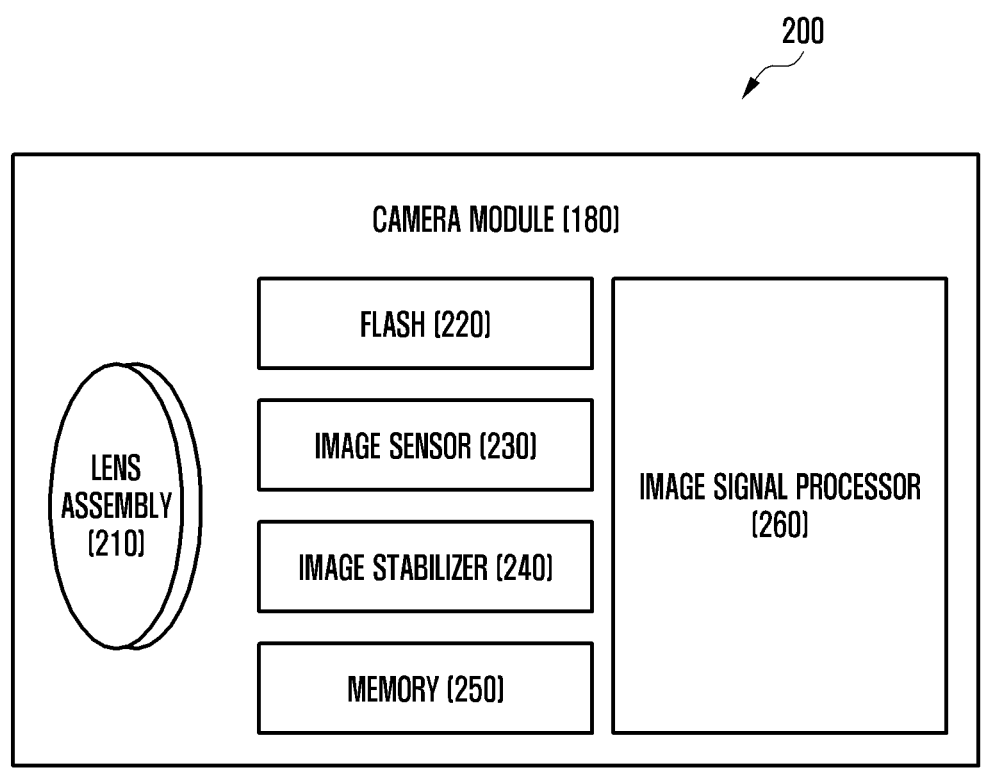
FIG. 2 is a block diagram of a camera module according to various embodiments of the disclosure.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens. The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
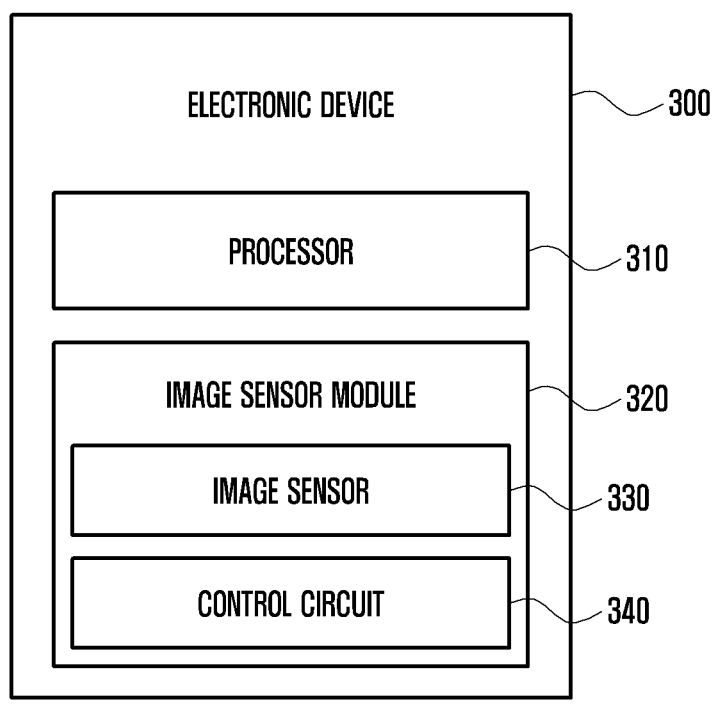
FIG. 3 is a block diagram of the configuration of an electronic device according to various embodiments of the disclosure.

FIG. 3 is a block diagram of the configuration of an electronic device according to various embodiments of the disclosure.

FIG. 3 is a block diagram of the configuration of an electronic device 300 according to various embodiments of the disclosure. According to various embodiments, the electronic device 300 may include the whole or a part of the electronic device 101 of FIG. 1, or may include the whole or a part of the camera module 180 of FIG. 2.

According to various embodiments, the electronic device 300 may include a processor 310 (e.g., the processor 260) and an image sensor module 320.

The processor 310 may transfer, for example, a command to the image sensor module 320. For example, the processor 310 may transfer a command to control the image sensor 330 (e.g., exposure time control, readout timing control, or the like) to a control circuit 340. For example, the processor 310 may transfer a command to control a readout speed corresponding to the image sensor 330 to the control circuit 340.

The processor 310, for example, may obtain an image using the image sensor 330 included in the image sensor module 320. For example, the processor 310 may receive an image generated based on electron hole pairs (EHPs) accumulated in the image sensor 330, via the control circuit 340. In this instance, the processor 310, for example, may receive an image from the control circuit 340 via an MIPI.

The processor 310, for example, may compare two or more images. For example, the processor 310 may identify at least one object included in each of the two or more images, and based on the location of the at least one object included in each of the two or more images, may determine the movement of the object included in the two or more images. For example, the processor 310 may determine the brightness of two or more images by comparing the two or more images. The processor 310, for example, may determine an illuminance related to two or more images, based on the brightness of the two or more images. Although an illuminance is described as an example of a value corresponding to a brightness or a lightness, various embodiments of the disclosure are not limited to the illuminance. The value corresponding to the brightness may include a luminance, a luminous flux, a luminous intensity, and the like, in addition to the illuminance. For example, if the brightness of two or more images is greater than a predetermined reference, the processor 310 may determine that the two or more images are shot in an environment having a high illuminance. For example, if the brightness of an image obtained earlier among two or more images is higher than the brightness of an image obtained later, the processor 310 may determine that the environment is changed from an environment having a high illuminance to an environment having a low illuminance.

The processor 310, for example, may determine a readout speed corresponding to the image sensor 330, based on the result of comparison between two or more images. For example, if the degree of the movement of an object included in at least one of two or more images is less than a predetermined threshold value, the processor 310 may determine a first readout speed to be the readout speed corresponding to the image sensor 330. If the degree of the movement of the object included in at least one of the two or more images is greater than or equal to the predetermined threshold value, the processor 310 may determine a second readout speed, which is faster than the first readout speed, to be the readout speed corresponding to the image sensor 330. For example, if an illuminance value related to two or more images is greater than a predetermined threshold value, the processor 310 may determine the first readout speed to be the readout speed corresponding to the image sensor 330. If the illuminance value related to the two or more images is less than or equal to the predetermined threshold value, the processor 310 may determine the second readout speed, which is faster than the first readout speed, to be the readout speed corresponding to the image sensor 330.

If the readout speed corresponding to the image sensor 330 is changed from the first readout speed to the second readout speed, the processor 310, for example, may copy an image obtained last among the images obtained according to the first readout speed using the image sensor 330. If the readout speed corresponding to the image sensor 330 is changed from the first readout speed to the second readout speed, the processor 310, for example, may display the copied image, which is obtained last among the images obtained according to the first readout speed, before displaying images obtained according to the second readout speed, after displaying the images, obtained according to the first readout speed via the image sensor 330, on a display (not illustrated) (e.g., the display device 160).

If the readout speed corresponding to the image sensor 330 is changed from the first readout speed to the second readout speed, the processor 310, for example, may transfer, to the control circuit 340, a command to change the point in time at which the image sensor 330 initiates an operation of sensing light according to the changed second readout speed (hereinafter, "exposure operation"), to a point ahead of a predetermined point in time. If the readout speed corresponding to the image sensor 330 is changed from the first readout speed to the second readout speed, the processor 310, for example, may change an exposure time of the image sensor 330. In this instance, the processor 310, for example, may not change a frame per second.

If the readout speed corresponding to the image sensor 330 is changed from the second readout speed to the first readout speed, the processor 310, for example, may transfer, to the control circuit 340, a command to change the point in time at which the image sensor 330 initiates an operation of sensing light according to the changed first readout speed, to a point ahead of a predetermined point in time.

The processor 310, for example, may identify metadata of an image received from the control circuit 340. The processor 310 may identify the data type of an image received via an MIPI. The processor 310, for example, may determine whether an image received from the control circuit 340 is a compressed image, based on at least one of metadata and a data type. For example, the processor 310 may identify data that indicates that the corresponding image is a compressed image and is included in the metadata of the image, and may determine whether the image received from the control circuit 340 is a compressed image. For example, the processor 310 may identify whether the data type of the image received via the MIPI is a type corresponding to a compressed image, and may determine whether the image received from the control circuit 340 is a compressed image. In this instance, if the image received from the control circuit 340 is a compressed image, the processor 310, for example, may decompress the image. The processor 310 may decompress the compressed image using codec.

The image sensor module 320, for example, may include the image sensor 330 (e.g., the image sensor 230), and the control circuit 340.

The control circuit 340 may control, for example, the image sensor 330. The control circuit 340, for example, may receive a command to control the image sensor 330, from the processor 310. For example, the control circuit 340 may control the image sensor 330 according to a command to control the readout speed corresponding to the image sensor 330, which is received from the processor 310.

The image sensor 330, for example, may sense light outside the electronic device 330. For example, the image sensor 330 may sense light using a plurality of light detection devices, which are capable of detecting light and are included in the image sensor 330, according to the control related to an exposure time of the control circuit 340. The plurality of light detection devices may respectively accumulate electron hole pairs (EHPs) according to detected light. In this instance, the plurality of light detection devices, for example, may be referred to as pixels.

According to the control related to a readout timing of the control circuit 340, the image sensor 330, for example, may read out EHPs accumulated in each of the plurality of light detection devices, and may obtain raw data for generating an image based on the read out EHPs. For example, the image sensor 330 may initiate and/or terminate a readout operation, according to the control related to the readout timing of the control circuit 340. The image sensor 330, for example, may convert the raw data obtained based on the read out EHPs into digital signals, and may transfer an image corresponding to the converted digital signals to the control circuit 340.

If the readout speed determined by the processor 310 is the first readout speed, the control circuit 340 may transmit an image received from the image sensor 330 to the processor 310 via the MIPI without compression. If the readout speed determined by the processor 310 is the second readout speed, which is faster than the first readout speed, the control circuit 340 may compress an image received from the image sensor 330 and may transmit the compressed image to the processor 310 via the MIPI.

The control circuit 340, for example, may add data related to whether an image is compressed to metadata of the image transmitted to the processor 310. For example, if the image received from the image sensor 330 is compressed and transmitted to the processor 310, the control circuit 340 may add data indicating that the image is a compressed image to the metadata of the image transmitted to the processor 310.

Although not illustrated in FIG. 3, the image sensor module 320 may further include a memory (e.g., the memory 250). The control circuit 340 may store a digital signal received from the image sensor 330 in a memory, or may transmit a digital signal stored in the memory to the processor 310, based on the data transmission performance of the MIPI. The memory included in the image sensor module 320 may include, for example, a dynamic random-access memory (DRAM).

Figure 4A:
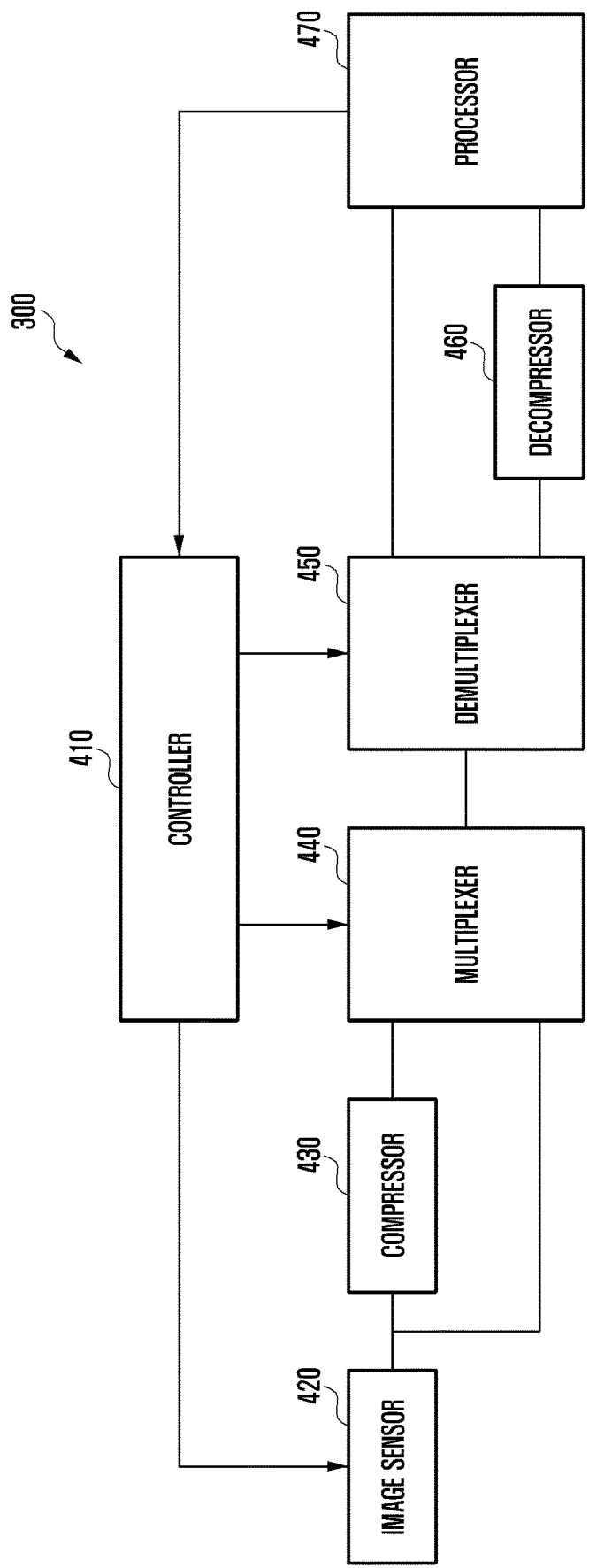
FIGS. 4A and 4B are block diagrams of the configuration of an electronic device according to various embodiments of the disclosure.
Figure 4B:
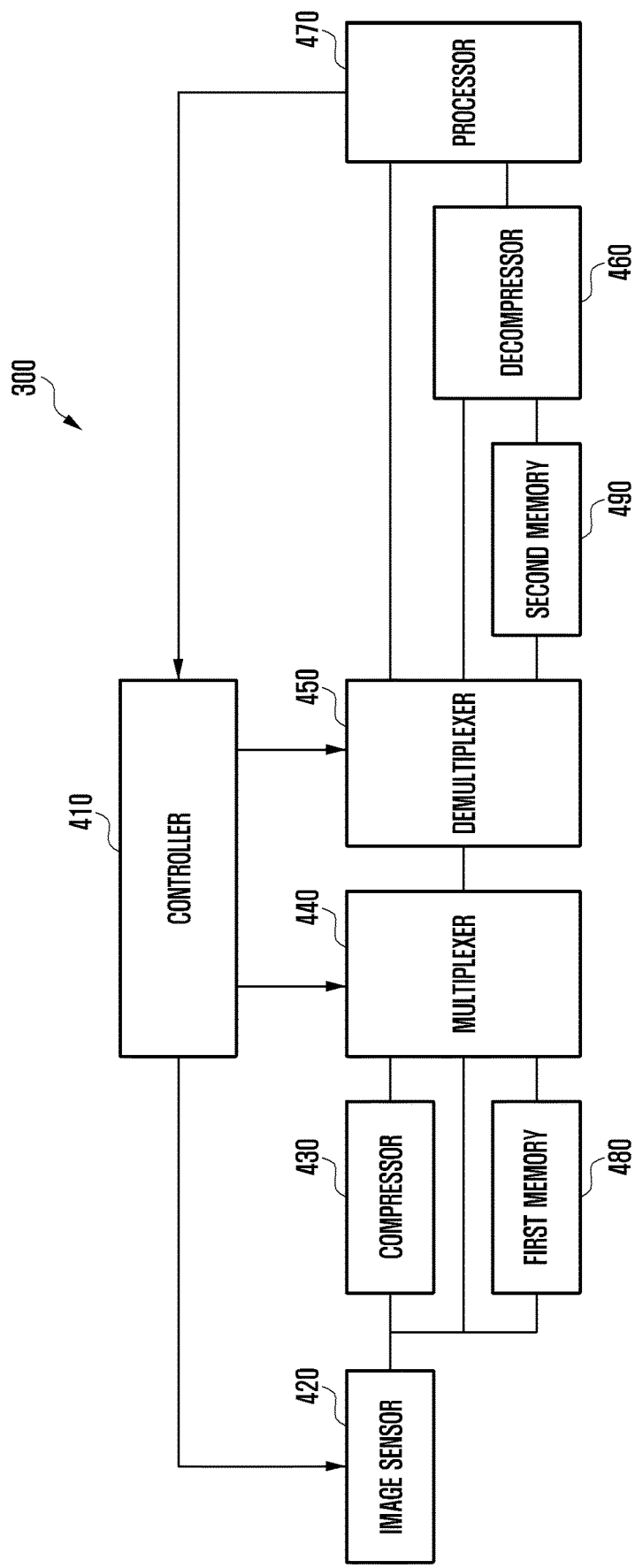

FIGS. 4A and 4B are block diagrams of the configuration of the electronic device 300 according to various embodiments of the disclosure. A detailed description which overlaps the description which has been described with reference to FIG. 3 will be omitted.

Referring to FIG. 4A, the electronic device 300, for example, may include a controller 410, an image sensor 420 (e.g., the image sensor 330), a compressor 430, a multiplexer (mux) 440, a demultiplexer (demux) 450, a decompressor 460, and/or a processor 470 (e.g., the processor 310).

The controller 410 may control, for example, the image sensor 420. For example, the controller 410 may control various operations related to an exposure time, a readout timing, a readout speed, and the like of the image sensor 420.

The image sensor 420, for example, may sense light outside the electronic device 330. For example, the image sensor 420 may sense light using a plurality of light detection devices, which are capable of detecting light and are included in the image sensor 420, according to the control related to an exposure time of the controller 410.

According to the control related to a readout timing of the controller 410, the image sensor 420, for example, may read out EHPs accumulated in each of the plurality of light detection devices, and may obtain raw data for generating an image based on the read out EHPs. For example, the image sensor 420 may initiate and/or terminate a readout operation, according to the control related to the readout timing of the controller 410.

The image sensor 420, for example, may convert the raw data obtained based on the read out EHPs into digital signals, and may transfer an image corresponding to the converted digital signals to the compressor 430 and/or multiplexer 440. For example, if a set readout speed is a first readout speed, the image sensor 420 may transmit the image to the multiplexer 440. For example, if the set readout speed is a second readout speed, which is faster than the first readout speed, the image sensor 420 may transmit the image to the compressor 430. For example, irrespective of the set readout speed, the image sensor 420 may transmit the image to the compressor 430 and the multiplexer 440.

The compressor 430, for example, may compress the image received from the image sensor 420. For example, the compressor 430 may compress the image into data of a type of joint photograph expert group (JPEG). Although a JPEG technology is described as an example of the image compression technologies in the disclosure, the disclosure is not limited thereto and may include graphics interchange format (GIF), portable network graphics (PNG), and the like.

The control circuit 410 may control, for example, the multiplexer 440. For example, if the readout speed determined by the processor 470 is the first readout speed, the controller 410 may perform control so that the multiplexer 440 transmits the image received from the image sensor 420 to the demultiplexer 450 via an MIPI. For example, if the readout speed determined by the processor 470 is the second readout speed, the controller 410 may perform control so that the multiplexer 440 transmits the image received from the compressor 430 to the demultiplexer 450 via an MIPI.

The demultiplexer 450, for example, may identify metadata in the image received from the multiplexer 440. The demultiplexer 450, for example, may identify the data type of the image received via the MIPI. The demultiplexer 450, for example, may determine whether the image received from the multiplexer 440 is a compressed image, based on at least one of the metadata and the data type of the image. For example, the demultiplexer 450 may identify data that indicates that the corresponding image is a compressed image and is included in the metadata of the image, and may determine whether the image received from the multiplexer 440 is a compressed image. For example, the demultiplexer 450 may identify whether the data type of the image received via the MIPI is a type corresponding to a compressed image, and may determine whether the image received from the multiplexer 440 is a compressed image.

If the image received from the multiplexer 440 is a compressed image, the demultiplexer 450, for example, may transmit the image to the decompressor 460. If the image received from the multiplexer 440 is not a compressed image, the demultiplexer 450, for example, may transmit the image to the processor 470.

The processor 470, for example, may transfer a command to the controller 410. For example, the processor 470 may transfer a command to control the image sensor 420 (e.g., exposure time control, readout timing control, or the like) to the controller 410. For example, the processor 470 may transfer a command to control the readout speed corresponding to the image sensor 420, to the controller 410.

The processor 470, for example, may compare two or more images. For example, the processor 470 may compare two or more images received from one of the demultiplexer 450 or the decompressor 460. The processor 470, for example, may identify at least one object included in each of the two or more images, and based on the location of the at least one object included in each of the two or more image, may determine the movement of the object included in the two or more images. For example, the processor 470 may determine the brightness of two or more images by comparing the two or more images. The processor 470, for example, may determine an illuminance related to two or more images, based on the brightness of the two or more images.

The processor 470, for example, may determine a readout speed corresponding to the image sensor 420, based on the result of comparison between two or more images. For example, if the degree of the movement of an object included in at least one of two or more images is less than a predetermined threshold value, the processor 470 may determine a first readout speed to be the readout speed corresponding to the image sensor 420. If the degree of the movement of the object included in at least one of two or more images is greater than or equal to the predetermined threshold value, the processor 470 may determine a second readout speed, which is faster than the first readout speed, to be the readout speed corresponding to the image sensor 420. For example, if an illuminance value related to two or more images is greater than a predetermined threshold value, the processor 470 may determine the first readout speed to be the readout speed corresponding to the image sensor 420. If the illuminance value related to the two or more images is less than or equal to the predetermined threshold value, the processor 470 may determine the second readout speed, which is faster than the first readout speed, to be the readout speed corresponding to the image sensor 420.

If the readout speed corresponding to the image sensor 420 is changed from the first readout speed to the second readout speed, the processor 470, for example, may copy an image obtained last among the images obtained according to the first readout speed using the image sensor 420.

If the readout speed corresponding to the image sensor 420 is changed from the first readout speed to the second readout speed, the processor 470, for example, may transfer, to the control circuit 410, a command to change the point in time at which the image sensor 420 initiates an operation of sensing light according to the changed second readout speed, to a point ahead of a predetermined point in time.

If the readout speed corresponding to the image sensor 420 is changed from the second readout speed to the first readout speed, the processor 470, for example, may transfer, to the controller 410, a command to change the point in time at which the image sensor 420 initiates an operation of sensing light according to the changed first readout speed, to a point ahead of a predetermined point in time.

The controller 410, the compressor 430, and/or the multiplexer 440, for example, may be implemented as a single module or separate modules. The controller 410, the compressor 430, and/or the multiplexer 440, for example, may be implemented as at least a part of the control circuit 340 of FIG. 3. The demultiplexer 450, the decompressor 460, and/or the processor 470, for example, may be implemented as a single module. The demultiplexer 450, decompressor 460, and/or the processor 470, for example, may be implemented as at least a part of the processor 310 of FIG. 3.

Referring to FIG. 4B, the electronic device 300 may further include a first memory 480 and/or a second memory 490.

The image sensor 420, for example, may convert raw data obtained based on read out EHPs into digital signals, and may transfer an image corresponding to the converted digital signals to the compressor 430, multiplexer 440, and/or the first memory 480. For example, if a set readout speed is a first readout speed, the image sensor 420 may transmit the image to the multiplexer 440. For example, if the set readout speed is a second readout speed, which is faster than the first readout speed, the image sensor 420 may transmit the image to the compressor 430. For example, if the set readout speed is the second readout speed, which is faster than the first readout speed, the image sensor 420 may transmit the image to the first memory 480. For example, irrespective of the set readout speed, the image sensor 420 may transmit the image to the compressor 430 and the multiplexer 440.

The control circuit 410 may control, for example, the multiplexer 440. For example, if the readout speed determined by the processor 470 is the first readout speed, the controller 410 may perform control so that the multiplexer 440 transmits an image received from the image sensor 420 to the demultiplexer 450 via an MIPI. For example, if the readout speed determined by the processor 310 is the second readout speed, the controller 410 may perform control so that the multiplexer 440 transmits the image received from the compressor 430 to the demultiplexer 450 via an MIPI. For example, if the readout speed determined by the processor 310 is the second readout speed, the controller 410 may perform control so that the multiplexer 440 transmits the image stored in the first memory 480 to the demultiplexer 450 via an MIPI, based on the data transmission performance of the MIPI.

If the image received from the multiplexer 440 is a compressed image, the demultiplexer 450, for example, may transmit the image to the decompressor 460. If the image received from the multiplexer 440 is a compressed image, the demultiplexer 450, for example, may transmit the image to the second memory 490. In this instance, the demultiplexer 450, for example, may transmit the image to the second memory 490 according to a command from the processor 470.

If the image received from the multiplexer 440 is not a compressed image, the demultiplexer 450, for example, may transmit the image to the processor 470.

The decompressor 460, for example, may decompress the image received from the demultiplexer 450, and may transmit the decompressed image to the processor 470. The decompressor 460, for example, may decompress the image stored in the second memory 490, and may transmit the decompressed image to the processor 470. In this instance, the demultiplexer 450, for example, may transmit the image to the second memory 490 according to a command from the processor 470. For example, the processor 470 may perform control so that the decompressor 460 decompresses the image stored in the second memory 490 and transmits the decompressed image to the processor 470, based on an image processing state. The first memory 480 and/or the second memory 490, for example, may include a DRAM.

Figure 5:
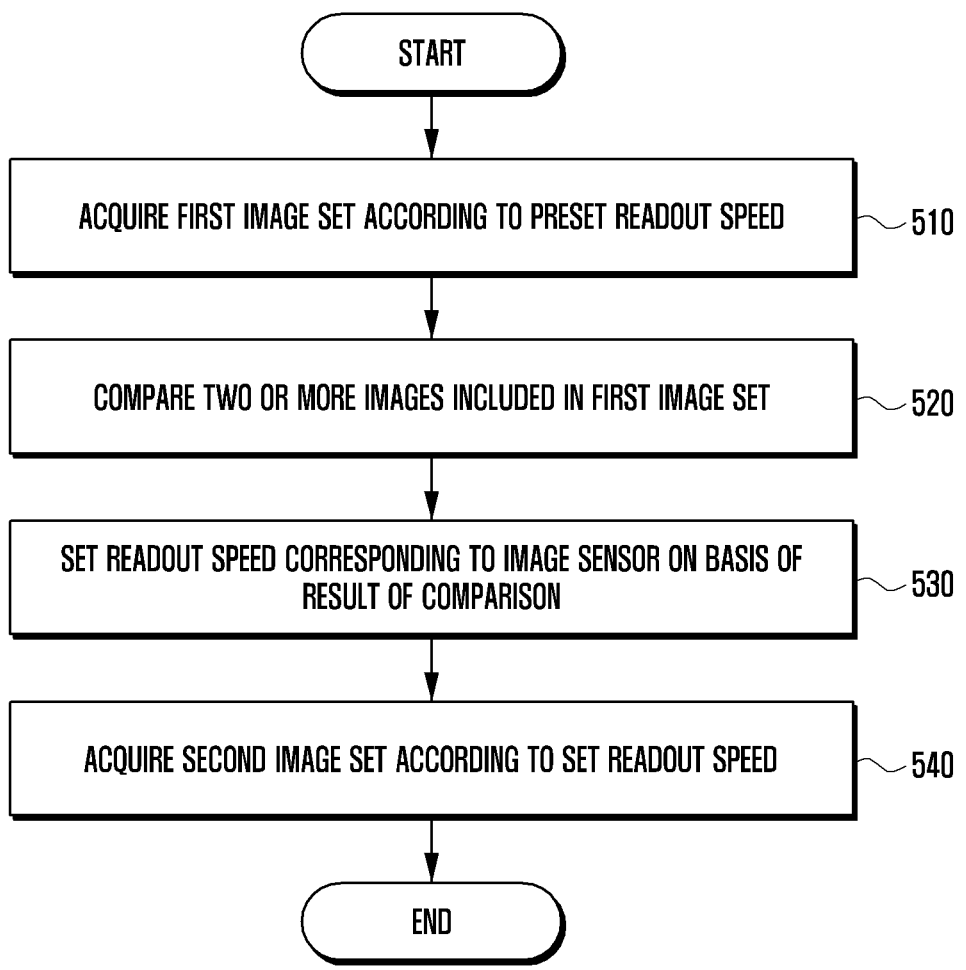
FIG. 5 is a flowchart illustrating a method of acquiring an image by an electronic device according to various embodiments of the disclosure.

FIG. 5 is a flowchart illustrating a method of acquiring an image by the electronic device 300 according to various embodiments of the disclosure. A detailed description which overlaps the description which has been described with reference to FIG. 3 will be omitted.

According to various embodiments, the processor 310 may obtain a first image set according to a predetermined readout speed, in operation 510. The processor 310, for example, may transmit, to the control circuit 340, a command to control the image sensor 300 to read out accumulated electron hole pairs (EHPs) at a predetermined readout speed, and may receive an image from the control circuit 340 via an MIPI. In this instance, the predetermined readout speed, for example, may be one of a first readout speed and a second readout speed which is faster than the first readout speed. The processor 310, for example, may display at least one image included in the first image set, on a display.

According to various embodiments, the processor 310 may compare two or more images included in the first image set in operation 520. For example, the processor 310 may identify at least one object included in each of the two or more images of the first image set, and based on the location of the at least one object included in each of the two or more images, may determine the movement of the object included in the two or more images. For example, the processor 310 may determine the brightness of two or more images by comparing the two or more images. The processor 310, for example, may determine an illuminance related to two or more images, based on the brightness of the two or more images. For example, if the brightness of the two or more images is greater than a predetermined reference, the processor 310 may determine that the two or more images are shot in an environment having a high illuminance. For example, if the brightness of an image obtained earlier among two or more images is higher than the brightness of an image obtained later, the processor 310 may determine that the environment is changed from an environment having a high illuminance to an environment having a low illuminance.

According to various embodiments, the processor 310 may set a readout speed corresponding to the image sensor 330 based on the result of comparison between the two or more images included in the first image set, in operation 530.

If the degree of the movement of an object included in at least one of the two or more images of the first image set is less than a predetermined threshold value, the processor 310, for example, may set the readout speed corresponding to the image sensor 330 to a first readout speed. If the degree of the movement of the object included in at least one of two or more images is greater than or equal to the predetermined threshold value, the processor 310 may set the readout speed corresponding to the image sensor 330 to a second readout speed, which is faster than the first readout speed.

If an illumination related to two or more images included in the first image set is greater than a predetermined threshold value, the processor 310, for example, may set the readout speed corresponding to the image sensor 330 to the first readout speed. If the illumination related to two or more images included in the first image set is less than or equal to the predetermined threshold value, the processor 310 may set the readout speed corresponding to the image sensor 330 to the second readout speed, which is faster than the first readout speed.

According to various embodiments, the processor 310 may obtain a second image set according to the readout speed set in operation 530, in operation 540. The processor 310, for example, may transmit, to the control circuit 340, a command to control the image sensor 300 to read out accumulated electron hole pairs (EHPs) at the readout speed set in operation 530, and may receive an image from the control circuit 340 via an MIPI.

The processor 310, for example, may display at least one image included in the second image set, on a display. In this instance, if the readout speed corresponding to the image sensor 330 is changed from the first readout speed to the second readout speed in operation 530, the processor may copy an image obtained last among the images included in the first image set, and may display the copied image on the display before displaying at least one image included in the second image set, after displaying the images included in the first image set on the display.

If the readout speed corresponding to the image sensor 330 is changed from the first readout speed to the second readout speed, the processor 310, for example, may transfer, to the control circuit 340, a command to change the point in time at which the image sensor 330 initiates an operation of sensing light according to the changed second readout speed, to a point ahead of a predetermined point in time.

If the readout speed corresponding to the image sensor 330 is changed from the second readout speed to the first readout speed, the processor 310, for example, may transfer, to the control circuit 340, a command to change the point in time at which the image sensor 330 initiates an operation of sensing light according to the changed first readout speed, to a point ahead of a predetermined point in time.

Figure 6:
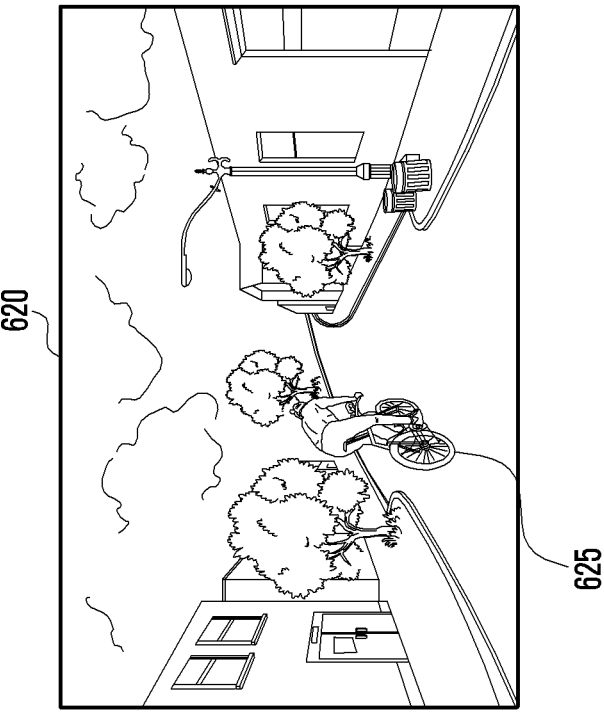
FIG. 6 is a conceptual diagram illustrating a plurality of images related to determining of a readout speed according to various embodiments of the disclosure.
Figure 6:
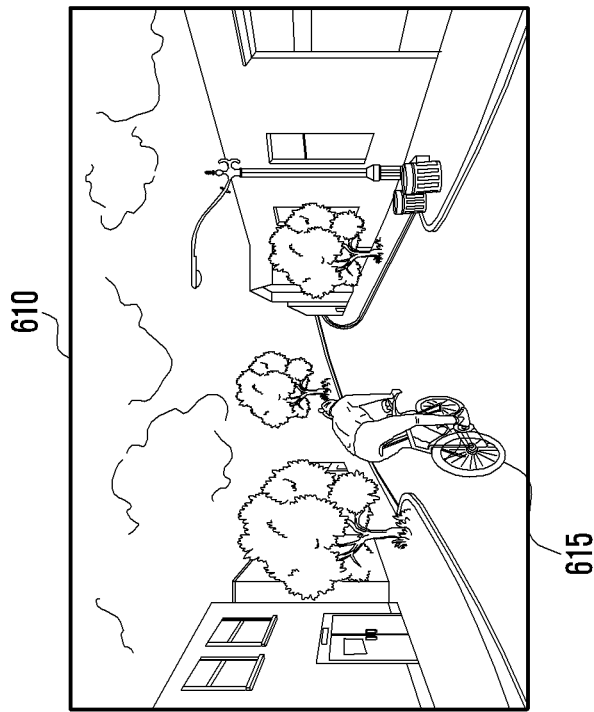

FIG. 6 is a conceptual diagram illustrating a plurality of images related to determining of a readout speed according to various embodiments of the disclosure.

Referring to FIG. 6, the processor 310 may compare images 610 and 620 included in an image set obtained using the image sensor 330. The processor 310 may identify a first object 615 included in the first image 610 and a second object 625 included in the second image 620, and may determine that the first object 615 and the second object 625 are objects corresponding to the same subject.

The processor 310 may determine the movement of the subject corresponding to the first object 615 and the second object 625 by comparing the location of the first object 615 in the first image 610 and the location of the second object 625 in the second image 620.

Figure 7A:
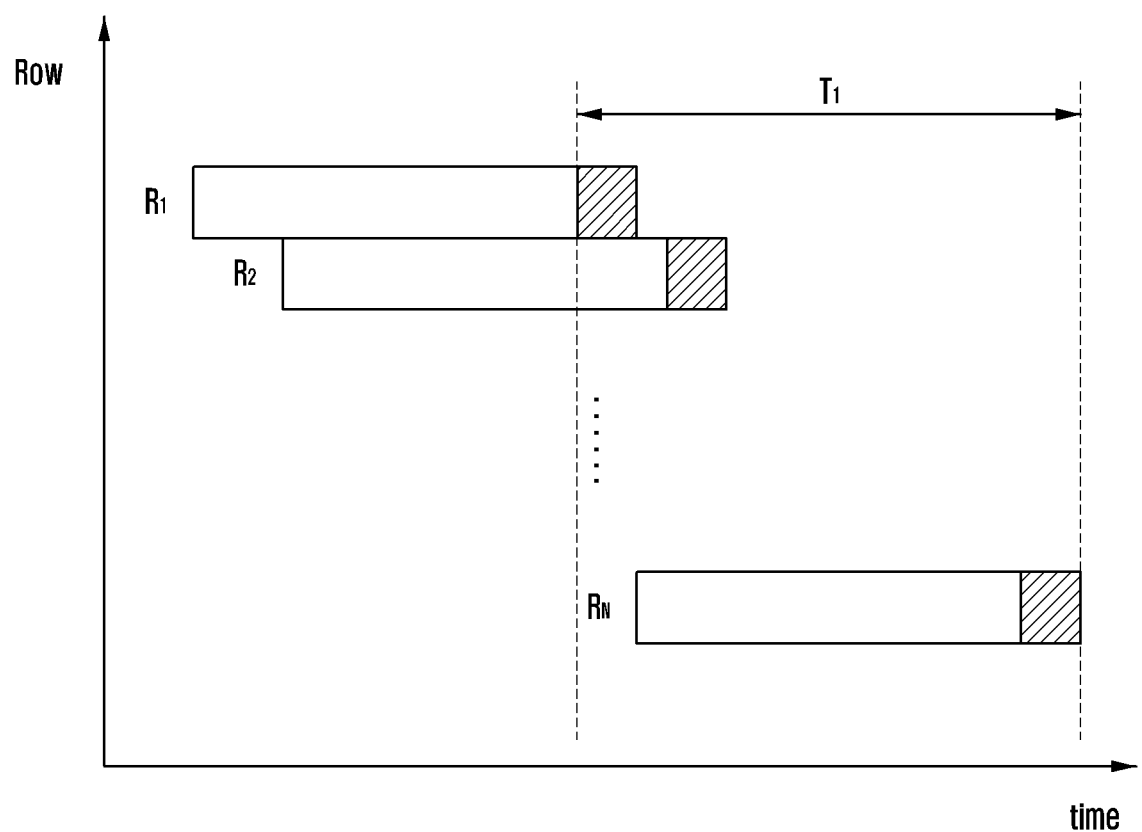
FIGS. 7A and 7B are diagrams illustrating examples of operation of an image sensor related to a readout speed according to various embodiments of the disclosure.
Figure 7B:
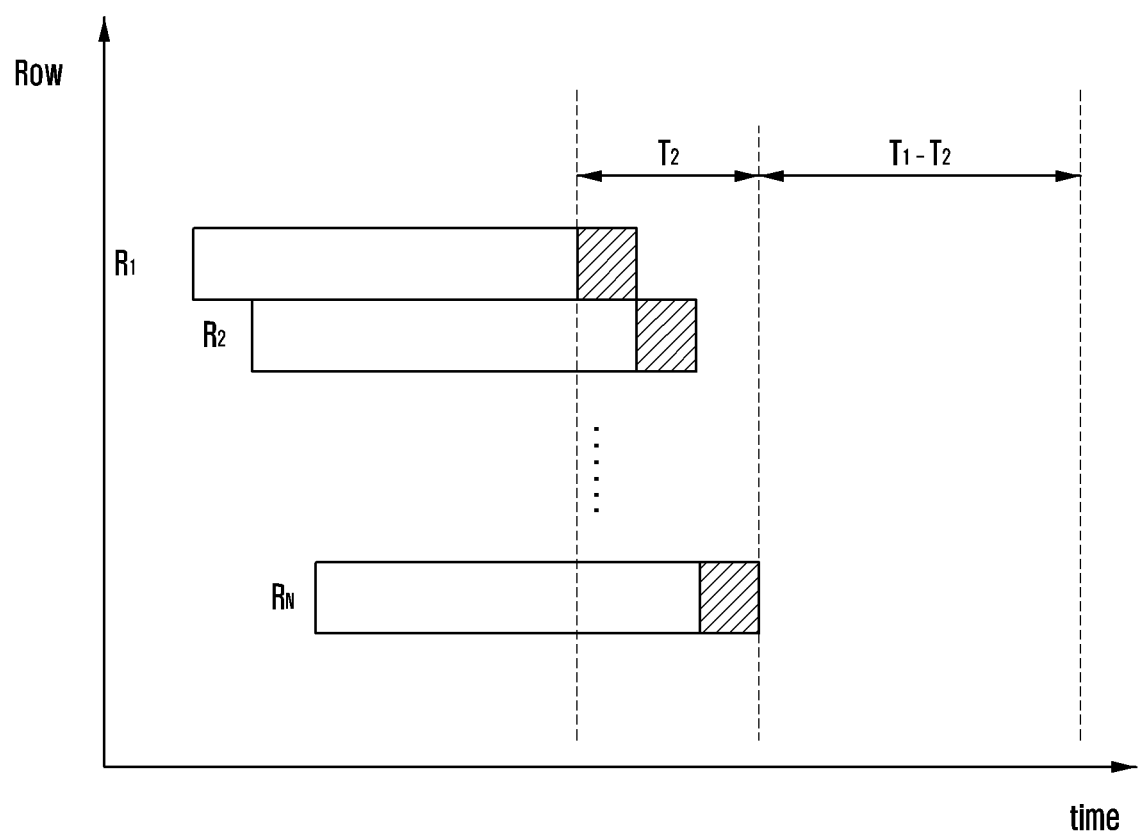

FIGS. 7A and 7B are diagrams illustrating examples of operation of the image sensor 330 related to a readout speed according to various embodiments of the disclosure.

The image sensor 330 according to various embodiments may include a plurality of row lines including a pixel array, and may control operation of pixels in units of row lines. The image sensor 330, for example, may sequentially select a plurality of row lines. The image sensor 330, for example, may perform an exposure operation sequentially in units of row lines, and may perform a readout operation sequentially in units of row lines, after a predetermined exposure time elapses. FIGS. 7A and 7B illustrates that the image sensor 330 controls a plurality of row lines while obtaining a single image.

Referring to FIG. 7A, the image sensor 330 may sequentially select a plurality of row lines (e.g., R1, R2, and RN), and may sequentially perform an exposure operation with respect to the plurality of row lines (e.g., R1, R2, and RN).

The image sensor 330 may read out electron hole pairs (EHPs) accumulated in the plurality of row lines (e.g., R1, R2, and RN), at a first readout speed. Therefore, it is identified that the amount of time spent on reading out from the first row line (R1) to the last row line (RN) is T1.

Referring to FIG. 7B, the image sensor 330 may read out electron hole pairs (EHPs) accumulated in the plurality of row lines (e.g., R1, R2, and RN), at a second readout speed which is faster than the first readout speed. Therefore, it is identified that the amount of time spent on reading out from the first row line (R1) to the last row line (RN) is T2.

Figure 8A:
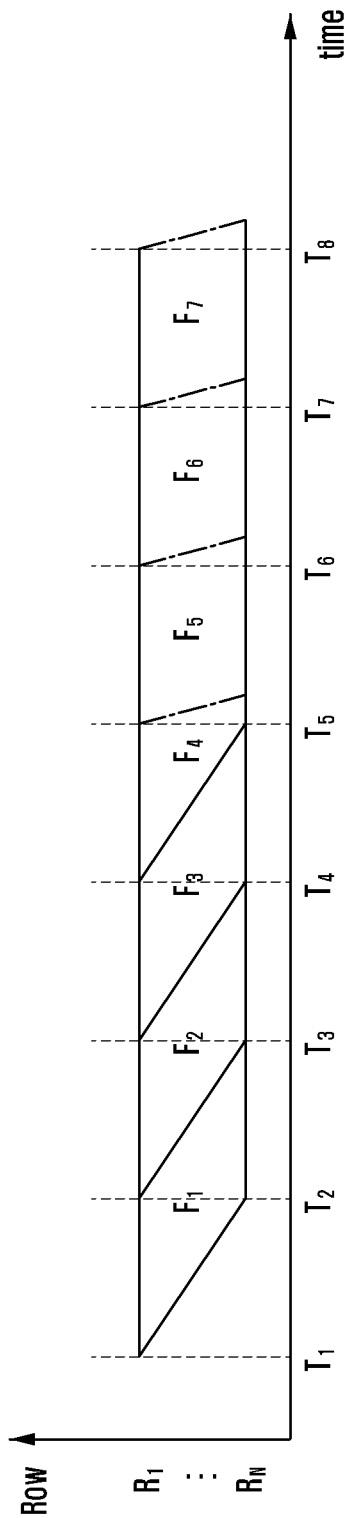
FIGS. 8A and 8B are diagrams illustrating examples of operation of an image sensor related to changing of a readout speed according to various embodiments of the disclosure.
Figure 8B:
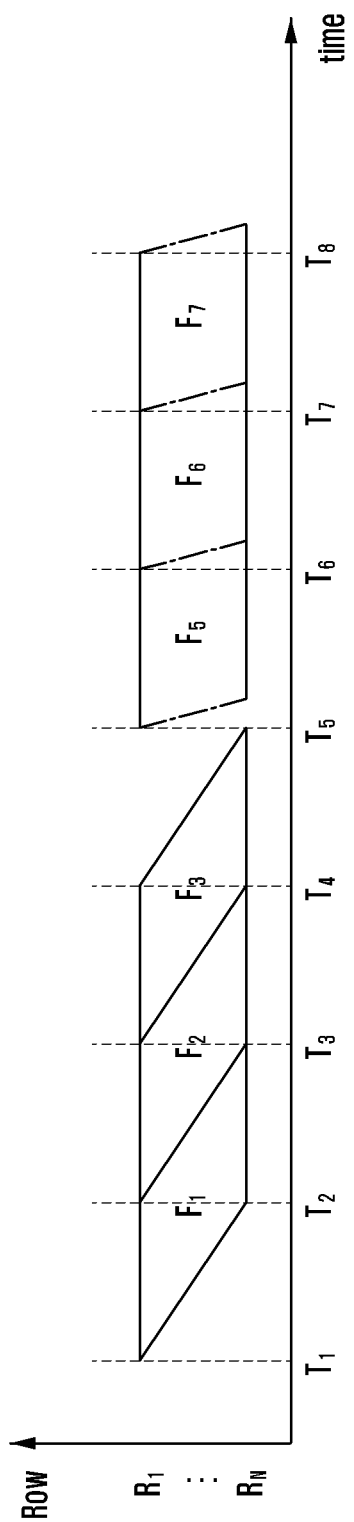

FIGS. 8A and 8B are diagrams illustrating examples of operation of the image sensor 330 related to changing of a readout speed according to various embodiments of the disclosure. A detailed description which overlaps the description which has been described with reference to FIGS. 7A and 7B will be omitted.

Referring to FIG. 8A, the image sensor 330 may sequentially select a plurality of row lines (e.g., R1 and RN), and may sequentially perform an exposure operation and a readout operation with respect to the plurality of row lines (e.g., R1 and RN).

In the disclosure, for ease of description, the amount of time spent on a readout operation performed in each of the plurality of row lines (e.g., R1 and RN) is not taken into consideration. An exposure operation and readout operation related to a first readout speed is marked by a solid line, and an exposure operation and readout operation related to a second readout speed is marked by a one-dot chain line. In the disclosure, for ease of description, it is assumed that a predetermined exposure time of the image sensor 330 is $\frac{1}{30}$ seconds.

The image sensor 330 may sequentially perform an exposure operation corresponding to a first image (F1) with respect to a plurality of row lines (e.g., R1 and RN) from T1. The image sensor 330 may sequentially perform a readout operation corresponding to the first image (F1) with respect to the plurality of row lines (e.g., R1 and RN) from T2. In this instance, the image sensor 330 may perform the readout operation at the first readout speed.

The image sensor 330 may perform an exposure operation corresponding to a second image (F2) with respect to each of the plurality of row lines (e.g., R1 and RN), immediately after completing the readout operation corresponding to the first image (F1) with respect to each of the plurality of row lines (e.g., R1 and RN). For example, the image sensor 330 may perform the exposure operation corresponding to the second image (F2) at the first row line (R1), immediately after completing the readout operation corresponding to the first image (F1) at the first row line (R1).

In the disclosure, for example, if the control circuit 340 receives a control command from the processor 310 in an $n^{th}$ frame interval, the control circuit 340 may apply the control command received from the processor 310 to an $n+1^{th}$ frame or $n+2^{th}$ frame. Here, the frame interval may refer to a time interval corresponding to a single image. For example, the frame interval may be an interval from the point in time at which an $n^{th}$ readout starts to the point in time at which an $n+1^{th}$ readout starts in the first row line (R1) of the image sensor 330, or may be an interval from the point in time at which the $n^{th}$ readout ends to the point in time at which the $n+1^{th}$ readout ends in the first row line (R1) of the image sensor 330. Although the embodiment describes an example in which a control command received from the processor 260 in an $n^{th}$ frame interval is applied to an $n+1^{th}$ frame, the disclosure is not limited to the embodiment.

The image sensor 330 may sequentially perform an exposure operation corresponding to a fourth image (F4) with respect to the plurality of row lines (e.g., R1 and RN) from T4. If the control circuit 340 changes the readout speed corresponding to the image sensor 330 in the frame interval of a third image (F3), from the first readout speed to the second readout speed, the image sensor 330 may sequentially perform a readout operation corresponding to the fourth image (F4) with respect to the plurality of row lines (e.g., R1 and RN) from T5, and may perform an exposure operation corresponding to a fifth image (F5) with respect to each of the plurality of row lines (e.g., R1 and RN), immediately after completing the readout operation corresponding to the fourth image (F4) performed for each of the plurality of row lines (e.g., R1 and RN).

In this instance, in association with the fourth image (F4), the exposure time for each of the plurality of row lines (e.g., R1 and RN) of the image sensor 330 is different from each other. Therefore, the processor 310 may obtain the fourth image (F4) which is a low-quality image, from the image sensor 330.

Referring to FIG. 8B, the processor 310 may remove the fourth image (F4) which is a low-quality image. In this instance, in order to overcome a frame gap occurring when the fourth image (F4) is removed, the processor 310 may copy the third image (F3) obtained last among the images obtained at the first readout speed. The processor 310 may display the copied image of the third image (F3) before displaying the images (F5, F6, and F7) obtained at the second readout speed on the display, after displaying the images (F1, F2, and F3) obtained at the first readout speed on the display.

FIGS. 9A to 9D are diagrams illustrating examples of operation of the image sensor 330 related to changing of a readout speed according to various embodiments of the disclosure. A detailed description which overlaps the description which has been described with reference to FIGS. 8A and 8B will be omitted.

Figure 9A:
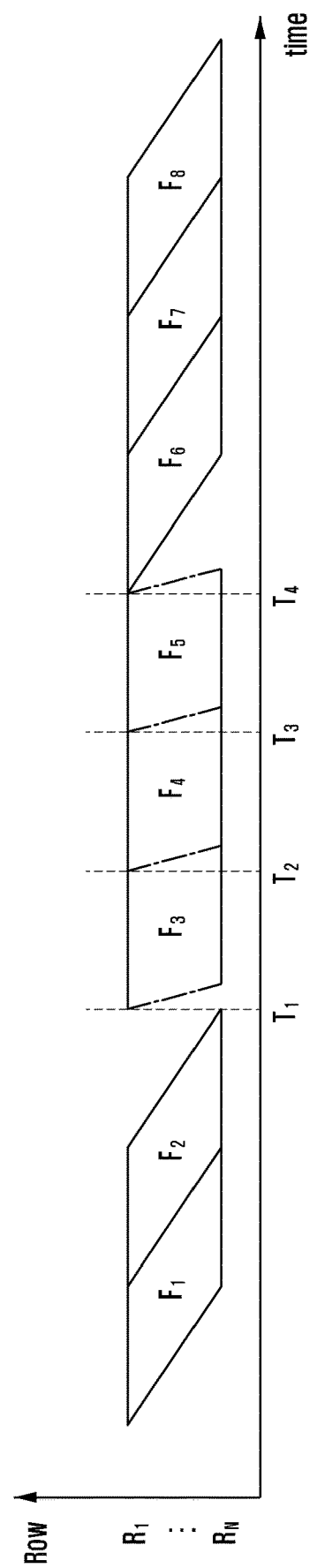
FIGS. 9A, 9B, 9C and 9D are diagrams illustrating examples of operation of an image sensor related to changing of a readout speed according to various embodiments of the disclosure.

Referring to FIG. 9A, the image sensor 330 may sequentially select a plurality of row lines (e.g., R1 and RN), and may sequentially perform an exposure operation and a readout operation with respect to the plurality of row lines (e.g., R1 and RN).

The processor 310 may remove a low-quality image obtained immediately before obtaining a third image (F3) related to a second readout speed, when the readout speed corresponding to the image sensor 330 in a frame interval of a second image (F2) is changed from a first readout speed to the second readout speed.

The processor 310 may perform control so that the control circuit 340 changes the readout speed corresponding to the image sensor 330 in the frame interval of a fifth image (F5) from the second readout speed to the first readout speed, and the image sensor 330 sequentially performs an exposure operation corresponding to a sixth image (F6) with respect to the plurality of row lines (e.g., R1 and RN) from T4.

An operation for overcoming a frame gap occurring when a low-quality image is removed, which is different from the operation of copying the second image (F2) as described in FIG. 8B, will be described with reference to FIGS. 9B to 9D.

Figure 9B:
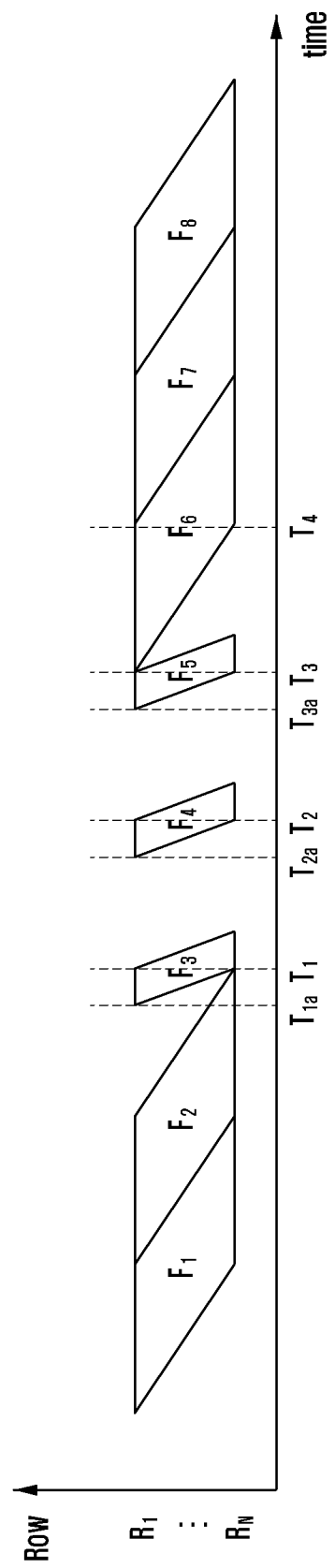

Referring to FIG. 9B, if the readout speed corresponding to the image sensor 330 in the frame interval of the second image (F2) is changed from the first readout speed to the second readout speed, the processor 310 may change the point in time at which an exposure operation corresponding to the third image (F3) starts at the second readout speed in the first row line (R1), from T1 to T1a. In this instance, the processor 310 may change the point in time at which the exposure operation corresponding to the third image (F3) starts according to the second readout speed, so that the exposure operation corresponding to the third image (F3) is performed immediately after the readout operation corresponding to the second image (F2) in the last low line (RN) of the plurality of row lines is completed.

If the readout speed corresponding to the image sensor 330 in the frame interval of the second image (F2) is changed from the first readout speed to the second readout speed, the processor 310 may change the exposure time of the image sensor 330 to $\frac{1}{4}$ of a predetermined exposure time. For example, if the exposure time of the image sensor 330 related to the first image (F1) and the second image (F2) is $\frac{1}{30}$ seconds, the processor 310 may change the exposure time of the image sensor 330 related to the third image (F3) to the fifth image (F5) to $\frac{1}{120}$ seconds. Therefore, the image sensor 330 may start the exposure operation corresponding to the third image (F3) at T1a according to the second readout speed, and may start the readout operation corresponding to the third image (F3) at T1, which is $\frac{1}{120}$ seconds after T1a, according to the second readout speed.

If the readout speed corresponding to the image sensor 330 in the frame interval of the fifth image (F5) is changed from the second readout speed to the first readout speed, the processor 310 may change the point in time at which the exposure operation corresponding to the sixth image (F6) starts according to the first readout speed in the first row line (R1), to T3.

Therefore, the processor 310 may perform the exposure operation corresponding to the sixth image (F6) $\frac{1}{30}$ seconds ahead of T4 that is the point in time at which the exposure operation corresponding to the sixth image (F6) starts in FIG. 9A.

Figure 9C:
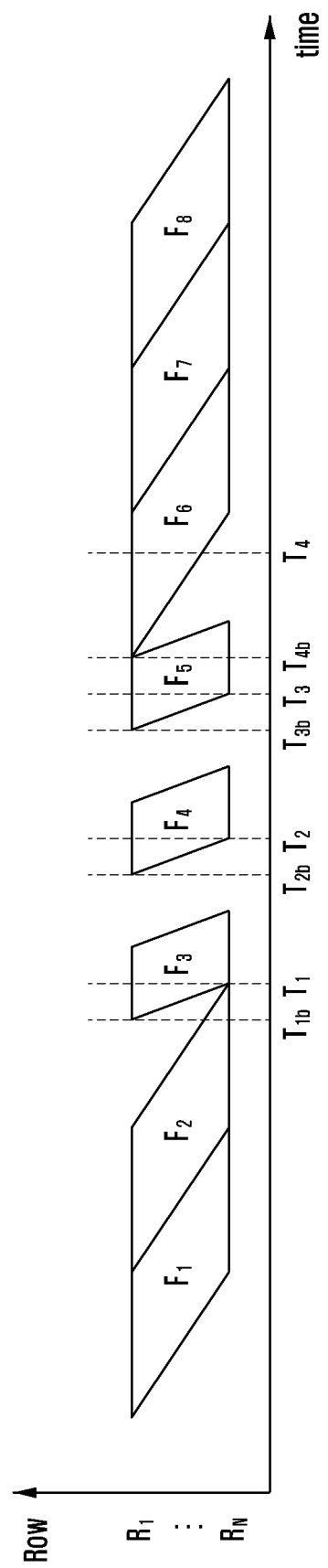
Figure 9D:
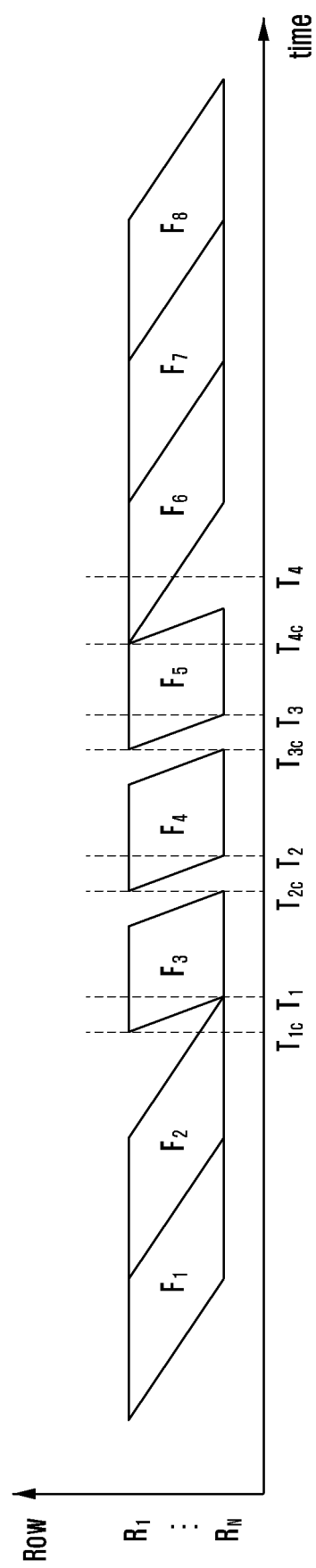

Referring to FIG. 9C, if the readout speed corresponding to the image sensor 330 in the frame interval of the second image (F2) is changed from the first readout speed to the second readout speed, the processor 310 may change the point in time at which the exposure operation corresponding to the third image (F3) starts according to the second readout speed in the first row line (R1), from T1 to T1b. In this instance, the processor 310 may change the point in time at which the exposure operation corresponding to the third image (F3) starts according to the second readout speed, so that the exposure operation corresponding to the third image (F3) is performed immediately after the readout operation corresponding to the second image (F2) in the last low line (RN) among the plurality of row lines is completed.

If the readout speed corresponding to the image sensor 330 in the frame interval of the second image (F2) is changed from the first readout speed to the second readout speed, the processor 310 may change the exposure time of the image sensor 330 to $\frac{1}{2}$ of a predetermined exposure time. For example, if the exposure time of the image sensor 330 related to the first image (F1) and the second image (F2) is $\frac{1}{30}$ seconds, the processor 310 may change the exposure time of the image sensor 330 related to the third image (F3) to the fifth image (F5) to $\frac{1}{60}$ seconds. Therefore, the image sensor 330 may start the exposure operation corresponding to the third image (F3) at T1b according to the second readout speed, and may start a readout operation corresponding to the third image (F3) $\frac{1}{60}$ seconds after T1b according to the second readout speed.

If the readout speed corresponding to the image sensor 330 in the frame interval of the fifth image (F5) is changed from the second readout speed to the first readout speed, the processor 310 may change the point in time at which an exposure operation corresponding to the sixth image (F6) starts according to the first readout speed in the first row line (R1), to T4b.

Therefore, the processor 310 may perform the exposure operation corresponding to the sixth image (F6) $1/40$ seconds ahead of T4 that is the point in time at which the exposure operation corresponding to the sixth image (F6) starts in FIG. 9A.

Referring to FIG. 9C, if the readout speed corresponding to the image sensor 330 in the frame interval of the second image (F2) is changed from the first readout speed to the second readout speed, the processor 310 may change the point in time at which the exposure operation corresponding to the third image (F3) starts according to the second readout speed in the first row line (R1), from T1 to T1c. In this instance, the processor 310 may change the point in time at which the exposure operation corresponding to the third image (F3) starts according to the second readout speed, so that the exposure operation corresponding to the third image (F3) is performed immediately after the readout operation corresponding to the second image (F2) in the last low line (RN) among the plurality of row lines is completed.

If the readout speed corresponding to the image sensor 330 in the frame interval of the second image (F2) is changed from the first readout speed to the second readout speed, the processor 310 may change the exposure time of the image sensor 330 to $3/4$ of a predetermined exposure time. For example, if the exposure time of the image sensor 330 related to the first image (F1) and the second image (F2) is $1/30$ seconds, the processor 310 may change the exposure time of the image sensor 330 related to the third image (F3) to the fifth image (F5) to $1/40$ seconds. Therefore, the image sensor 330 may start the exposure operation corresponding to the third image (F3) at T1c according to the second readout speed, and may start the readout operation corresponding to the third image (F3) at T2c, which is $1/40$ seconds after T1c, according to the second readout speed.

If the readout speed corresponding to the image sensor 330 in the frame interval of the fifth image (F5) is changed from the second readout speed to the first readout speed, the processor 310 may change the point in time at which the exposure operation corresponding to the sixth image (F6) starts according to the first readout speed in the first row line (R1), to T4c.

Therefore, the processor 310 may perform the exposure operation corresponding to the sixth image (F6) $1/60$ seconds ahead of T4 that is the point in time at which the exposure operation corresponding to the sixth image (F6) starts in FIG. 9A.

While the present disclosure has been described with reference to various embodiments, these embodiments are merely provided to assist in a comprehensive understanding of the present disclosure and are not intended to limit the present disclosure. Therefore, it should be understood by those skilled in the art, that various changes in form and detail may be made without departing from the spirit and scope of the present disclosure, which is defined, not by the detailed description and embodiments, but by the appended claims and their equivalents.

The invention claimed is:

1. An electronic device, comprising:
a processor; and
an image sensor module electrically connected to the processor,
wherein the image sensor module comprises an image sensor and a control circuit, which is electrically connected to the image sensor and is connected with the processor via an interface,
wherein the control circuit is configured to: transmit at least one image which is acquired from the image sensor according to a first readout speed, to the processor without compressing the at least one image; and
compress at least one image which is acquired from the image sensor according to a second readout speed, faster than the first readout speed, and transmit the at least one compressed image to the processor,
wherein the processor is configured to:
obtain a first image set according to a predetermined readout speed, using the image sensor;
compare at least two images included in the first image set;
set a readout speed corresponding to the image sensor to one of the first readout speed or the second readout speed, based on a result of comparison between the at least two images included in the first image set; and
obtain a second image set according to the set readout speed, which corresponds to one of the first readout speed or the second readout speed, using the image sensor.

2. The electronic device as claimed in claim 1, wherein the control circuit is configured to add data related to image compression to metadata of the at least one image transmitted to the processor, and
wherein the processor is configured to process the at least one image received from the control circuit, based on the data related to image compression included in the metadata of the at least one image received from the control circuit.

3. The electronic device as claimed in claim 1, wherein the processor is configured to:
determine a movement of at least one object related to the first image set, based on the result of comparison between the two or more images included in the first image set;
if a degree of the determined movement of the object is less than a predetermined threshold value, set the readout speed corresponding to the image sensor to the first readout speed; and
if the degree of the determined movement of the object is greater than or equal to the predetermined threshold value, set the readout speed corresponding to the image sensor to a second readout speed.

4. The electronic device as claimed in claim 1, wherein the processor is configured to:
determine an illuminance value (luminous intensity) related to the first image set, based on the result of comparison between the two or more images included in the first image set;
if the determined illuminance value is greater than predetermined threshold value, set the readout speed corresponding to the image sensor to the first readout speed; and
if the determined illuminance value is less than or equal to the predetermined threshold value, set the readout speed corresponding to the image sensor to the second readout speed.

5. The electronic device as claimed in claim 1, further comprising:
a display,
wherein the processor is configured to:
if the readout speed corresponding to the image sensor is changed from the first readout speed to the second readout speed, obtain the second image set according to the second readout speed; and
display at least one image acquired last among images included in the first image set on the display before displaying the second image set obtained according to the second readout speed, after displaying the first image set obtained according to the first readout speed.

6. The electronic device as claimed in claim 1, wherein the processor is configured to change a point in time at which the image sensor initiates an exposure operation according to the first readout speed, to a point ahead of a predetermined point in time, if the readout speed corresponding to the image sensor is changed from the second readout speed to the first readout speed.

7. An electronic device, comprising:
an image sensor;
a compressor electrically connected to the image sensor and configured to compress an image;
a multiplexer electrically connected to the image sensor and the compressor;
a demultiplexer electrically connected to the multiplexer;
a decompressor electrically connected to the demultiplexer, and configured to decompress a compressed image;
a controller electrically connected to the image sensor and the multiplexer; and
a processor electrically connected to the demultiplexer, the decompressor, and the controller,
wherein the controller is configured to:
control the image sensor so as to acquire at least one image according to one of a first readout speed and a second readout speed;
control the image sensor so as to transmit, to the compressor, at least one image acquired according to the first readout speed;
control the image sensor so as to transmit, to the compressor, at least one image acquired according to the second readout speed; and
perform control so that the multiplexer transmits, to the demultiplexer, one of an image received from the compressor and an image received from the image sensor,
wherein the demultiplexer is configured to transmit at least one image received from the multiplexer to one of the decompressor and the processor, and
wherein the processor is configured to:
obtain a first image set according to a designated readout speed using the image set;
compare at least two images included in the first image;
set a readout speed corresponding to the image sensor to one of the first readout speed or the second readout speed, based on a result of comparison between the two or more images included in the first image set;
transmit, to the controller, a command related to setting of the readout speed corresponding to the image sensor; and
obtain a second image set according to the set readout speed, which corresponds to one of the first readout speed or the second readout speed, using the image sensor.

8. The electronic device as claimed in claim 7, wherein the controller is configured to perform control, so that the multiplexer transmits one of an image received from the compressor and an image received from the image sensor to the demultiplexer, based on the command that is related to setting of the readout speed corresponding to the image sensor, and is received from the processor.

9. The electronic device as claimed in claim 7, wherein the compressor is configured to add data related to image compression to metadata of a compressed image, and
wherein the demultiplexer is configured to transmit the at least one image received from the multiplexer to one of the decompressor and the processor, based on the data related to image compression included in the metadata of the at least one image received from the multiplexer.

10. The electronic device as claimed in claim 7, wherein the processor is configured to:
determine a movement of at least one object related to the first image set, based on a result of comparison between the two or more images included in the first image set;
if a degree of the determined movement of the object is less than a predetermined threshold value, set the readout speed corresponding to the image sensor to the first readout speed; and
if the degree of the determined movement of the object is greater than or equal to the predetermined threshold value, set the readout speed corresponding to the image sensor to the second readout speed.

11. The electronic device as claimed in claim 7, wherein the processor is configured to:
determine an illuminance value related to the first image set, based on the result of comparison between the two or more images included in the first image set;
if the determined illuminance value is greater than a predetermined threshold value, set the readout speed corresponding to the image sensor to the first readout speed; and
if the determined illuminance value is less than or equal to the predetermined threshold value, set the readout speed corresponding to the image sensor to the second readout speed.

12. The electronic device as claimed in claim 7, further comprising:
a display,
wherein, if the readout speed corresponding to the image sensor is changed from the first readout speed to the second readout speed, the electronic device is configured to display a single image acquired last among images included in the first image set on the display before displaying, on the display, the second image set obtained according to the second readout speed, after displaying, on the display, the first image set obtained according to the first readout speed.

13. The electronic device as claimed in claim 7, wherein the processor is configured to change a point in time at which the image sensor initiates an exposure operation according to the first readout speed, to a point ahead of a predetermined point in time, if the readout speed corresponding to the image sensor is changed from the second readout speed to the first readout speed.

14. A method of acquiring an image by an electronic device, the method comprising:
obtaining a first image set according to a designated readout speed using an image sensor of the electronic device, by a processor of the electronic device;
comparing, by the processor, at least two images included in the first image set;

setting, by the processor, a readout speed corresponding to the image sensor to one of a first readout speed or a second readout speed, which is faster than the first readout speed, based on a result of comparison between the at least two images included in the first image set; and obtaining, by the processor, a second image set according to the set readout speed, which corresponds to one of the first readout speed or the second readout speed, using the image sensor;

compressing at least one image acquired using the image sensor according to the first readout speed, and transmitting the compressed image to the processor; and transmitting at least one image acquired from the image sensor according to the second readout speed to the processor without compression.

15. The method as claimed in claim 14, wherein the processor further comprises:

processing at least one image, based on data related to image compression included in meta data of the at least one image.

* * * * *